United States Patent [19]

Takada

[11] 4,150,799
[45] Apr. 24, 1979

[54] ACCELERATION RESPONSIVE AUTOMATIC LOCKING SAFETY BELT RETRACTOR

[75] Inventor: Juichiro Takada, Tokyo, Japan

[73] Assignee: Takata Kojyo Co., Ltd., Tokyo, Japan

[21] Appl. No.: 901,049

[22] Filed: Apr. 28, 1978

[30] Foreign Application Priority Data

May 17, 1977 [JP] Japan .............................. 52-055966

[51] Int. Cl.² ...................... B62B 35/02; B65H 75/48
[52] U.S. Cl. ............................................. 242/107.4 A
[58] Field of Search ................. 242/107.4 R, 107.4 E; 297/388; 280/744–747

[56] References Cited

U.S. PATENT DOCUMENTS

| | | | |
|---|---|---|---|
| 3,578,260 | 5/1971 | Kell | 240/107.4 A |
| 4,053,117 | 10/1977 | Takada | 242/107.4 A |
| 4,066,223 | 1/1978 | Takada | 242/107.4 A |

Primary Examiner—Harvey C. Hornsby
Assistant Examiner—John M. Jillions
Attorney, Agent, or Firm—Wolder, Gross & Yavner

[57] ABSTRACT

An acceleration responsive automatic braking safety belt retractor includes a mounting bracket having opposing side plates between which is journalled a shaft carrying a belt retraction wheel between the side plates and a ratchet wheel along the outside face of a first plate. A guide plate is affixed to the first plate outside face and has a circular opening registering with the ratchet wheel periphery and a linear guide slot vertically tangent to the opening and terminating at its top in a transverse stop shoulder and communicates along its upper inner side with the opening, the lower part of the communication being delineated by an outwardly downwardly inclined second stop shoulder. A stop member is longitudinally slidably engaged and depends from the slot and is provided with an inwardly directed projection having an arcuate upper edge and a bottom edge parallel to the second shoulder. A lever engages the stop member bottom edge and is swung upwardly by an acceleration actuated pendulum to raise the stop member and bring the projection into engagement with the ratchet wheel to brake it and the reel. In a modification, a second opposing slot and stop member are provided and the stop members being lever intercoupled to operate simultaneously.

10 Claims, 6 Drawing Figures

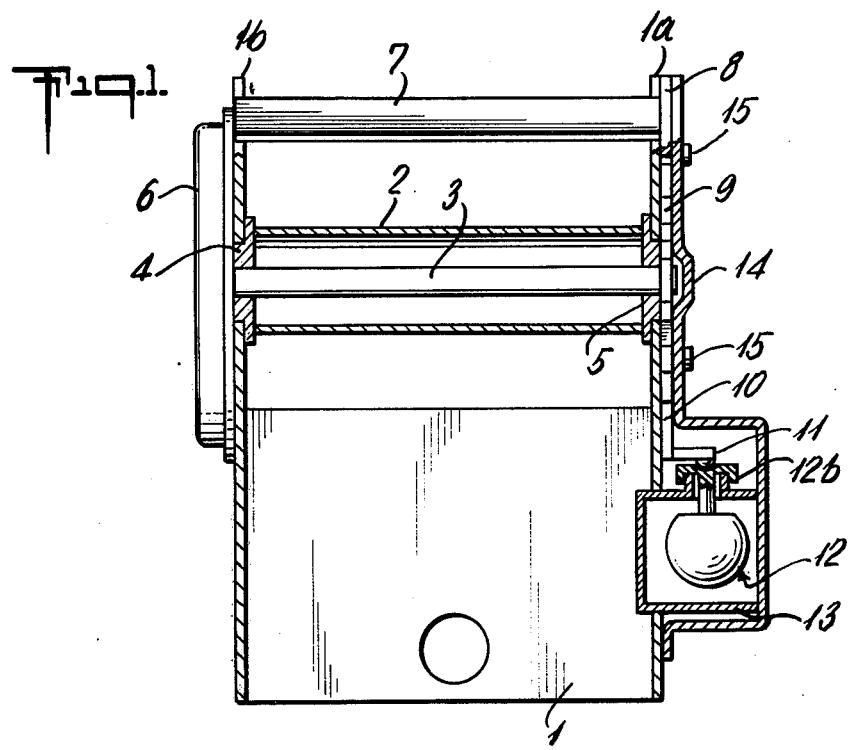
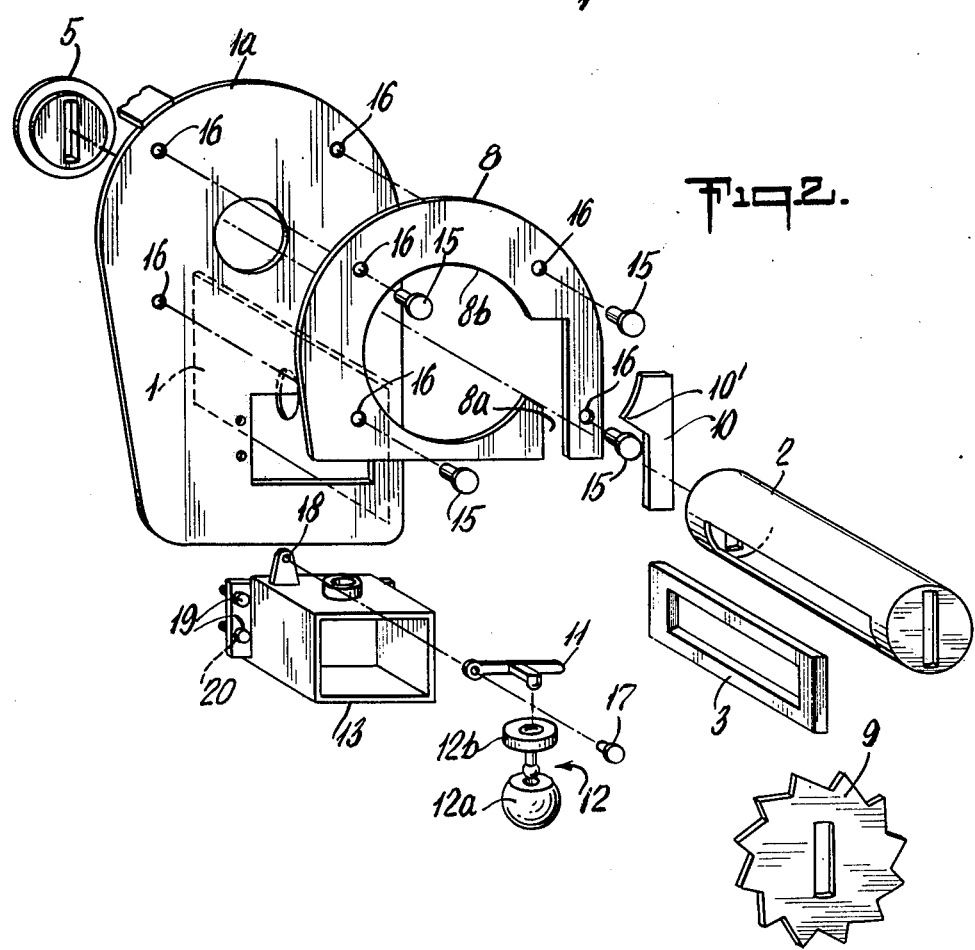

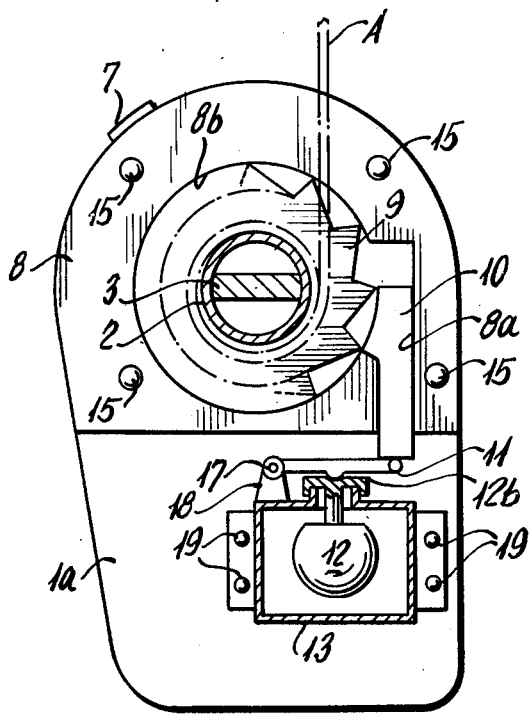
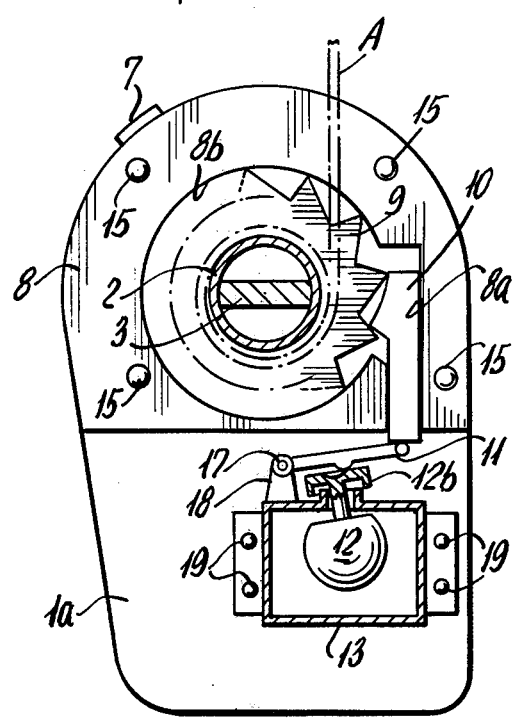
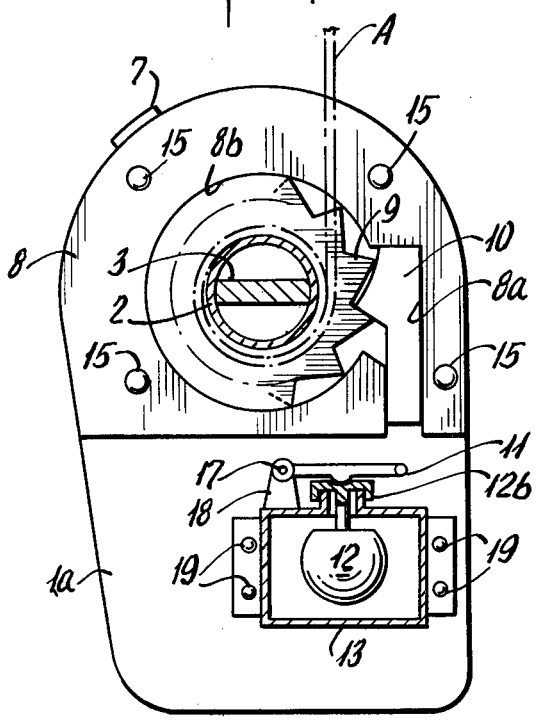
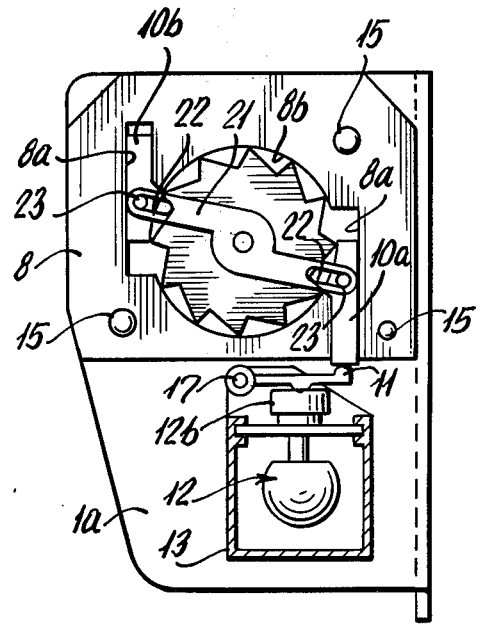

ACCELERATION RESPONSIVE AUTOMATIC LOCKING SAFETY BELT RETRACTOR

BACKGROUND OF THE INVENTION

The present invention relates generally to improvements in automatic locking safety belt retractors used in vehicles and it relates more particularly to an improved acceleration responsive automatic locking belt retractor provided with a mechanism for sensing the change of movement of a vehicle and locking the seat belt against extraction in response to a predetermined acceleration.

There are various types of conventional vehicle safety or restraint retractors which lock a seat belt in response to a sharp change in the speed of the vehicle when it collides with an object. In conventional retractors, however, the acceleration sensitivity is very high and the acceleration sensing mechanism is repeatedly actuated and deactuated at a high frequency. Consequently, for example, in a mechanism in which a ratchet wheel rotating with the belt retraction reel is engaged with a pawl to lock the reel and seat belt, it occasionally happens that the tips of the teeth of the ratchet wheel and the pawl tooth or tip are momentarily in the same position. In such an event, the tips of the ratchet wheel teeth, the rotational speed of which has been greatly increased by the belt withdrawing force outwardly kick or impel the pawl tooth so as to prevent the pawl from engaging the ratchet wheel. As a result, the belt is withdrawn a considerable and excessive amount by the time the pawl has returned to a proper position where it can engage the ratched wheel. The above occurrence substantially prevents the proper and reliable functioning of the seat belt. In some cases, the teeth of the ratchet wheel or the pawl tooth are damaged to thereby prevent a complete and proper engagement therebetween.

The applicant has previously proposed an automatic locking retractor reel in which the above-mentioned drawbacks encountered in conventional reels are eliminated and in which a pawl is not employed. In such a retractor, a stop member is provided which has a claw portion of projection engageable with and disengageable from the teeth of the ratchet wheel which rotates with the reel. When this stop member is moved in response to the displacement or acceleration of the vehicle to transfer the claw portion thereof from a nonengage position to an engage position, the withdrawal of seat belt is locked or stopped. However, the aforesaid retractor structure lacks a stop member receiving guide surface, the upward movement of the stop member being regulated by a long slot and a stop pin. In this retractor structure, the deterioration and wear of the stop member due to the repeated engaging impact actions cannot be avoided and a safe and reliable operation is not achieved.

SUMMARY OF THE INVENTION

It is a principal object of the present invention to provide an improved automatic locking safety belt retractor.

Another object of the present invention is to provide an improved vehicle acceleration responsive automatic locking safety belt retractor reel.

Still another object of the present invention is to provide an improved safety belt retractor reel provided with vehicle acceleration actuated reel locking member which is resistant to the wear attendant to repeated actuation at high frequency.

A further object of the present invention is to provide a device of the above nature characterized by its simplicity, ruggedness, long operable life and high reliability.

The above and other objects of the present invention will become apparent from a reading of the following description taken in conjunction with the accompanying drawings which illustrate preferred embodiments thereof.

In a sense the present invention contemplates the provision of an improved acceleration responsive automatic locking safety belt retractor in which the reel is rotatably supported by a frame having a side plate along a face of which is located a ratchet wheel rotatable with the reel. A housing plate overlies the side plate and has a circular opening registering with the ratchet wheel and a guide slot tangent to and in side communication with the opening and having an end first stop shoulder and a side transverse second stop shoulder. A stop member slidably engages the slot and is limited in movement by the stop shoulder. The stop member includes a claw or tooth which in the stop member retracted position is disengaged from the ratchet wheel and engages the second shoulder and in the stop member advanced or partially advanced position engages the ratchet wheel to brake it when the stop member is fully advanced and stopped by the first shoulder. The housing plate is covered by a cover plate and an acceleration sensing pendulum acts on the stop member to advance it in response to a predetermined vehicle acceleration. In a modified structure, a second guide slot and stop member are provided opposite to the first guide slot and stop member and are similar thereto and the stop members are intercoupled by a lever pivoted intermediate its ends to the central axis of the ratchet wheel so that the both stop members are simultaneously actuated.

The improved automatic locking retractor reel is simple, rugged, highly reliable and of long operable life.

BRIEF DESCRIPTION OF THE DRAWINGS

FIG. 1 is a vertical medial transverse sectional view of the retractor embodying the present invention;

FIG. 2 is a partially fragmented exploded perspective view thereof;

FIG. 3 is a side elevational view thereof, partially in section, showing the retractor in a belt extractable condition;

FIG. 4 is a view similar to FIG. 3 but in an initial lock actuated condition;

FIG. 5 is a view similar to FIG. 4 but in a reel fully locked condition; and

FIG. 6 is a view similar to FIG. 3 of another embodiment of the present invention.

DESCRIPTION OF THE PREFERRED EMBODIMENTS

Referring now to the drawings, particularly FIGS. 1 to 5 thereof which illustrate a preferred embodiment of the present invention, the reference numeral 1 generally designates a mounting frame which includes a vehicle anchoring cross-piece or base to which are secured opposite parallel side plates or member 1a and 1b between which extends and to which is journalled by means of bearings 4 and 5, a shaft 3. To the outer surface of side member 1b is secured a housing 6 containing a coil spring which is connected to shaft 3 to bias it in a belt retracting direction and impart a retracting force to the seat belt. On the shaft 3 is fixedly mounted a reel 2 around which the safety belt is wound so that the reel 2 and shaft 3 are rotated as a unit. To the opposite end along the outer surface of the other side member 1a is affixed a ratchet wheel 9 which rotates with shaft 3 and reel 2.

A stop member 10 is provided along side member 1a proximate the ratchet wheel 9 and is provided with a side projection, tooth or claw 10' which is engageable with and disengageable from the teeth of the ratchet wheel 9 with the longitudinal advance and retraction of the stop member. The stop member 10 is slidable in a longitudinal direction tangential to the periphery or circumscribed circle of the ratchet wheel 9, and the lower end of the stop member 10 contacts one end of a lever 11 which is swung by a sensing means as will be hereinafter described. Consequent to the swinging movement of the lever 11, the stop member is slidingly moved in the tangential direction with respect to the circumscribed circle of the ratchet wheel 9.

An auxiliary or guide member 8 is attached to the outer surface of the side member 1a of the frame 1. The auxiliary member 8 has circular hole 8b in the central portion thereof in which the ratchet wheel 9 nests, as well as an elongated recess or slot 8a formed continuously with and tangentially communicating at its upper side with the circular hole 8b. The recess 8a extends in the tangential direction with respect to the circular hole 8b and the stop member 10 is longitudinally slidably engaged to the recess 8a. The auxiliary member 8 is secured to the side member 1a with rivets 15 engaging aligned holes 16 in members 1a and retains the ratchet wheel 9 and stop member 10 within the hole 8b and recess 8a, respectively. The upper transverse end portion of the recess 8a serves as a stop shoulder or abutment whereby the upward movement of the stop member 10 is limited. At the lower end of the claw transfer portion of the recess 8a communicating with or joining the hole 8b, is an inclined stop shoulder which abuts claw 10' of the stop member 10 at the terminus of the downward movement thereof. The stop member receiving portion or top shoulder of the recess 8a has a width slightly larger than that of the stop member 10, and the claw receiving portion or inclined stop shoulder thereof has a width substantially the same as the length of the claw 10', so that stop member receiving operations are stably performed. The upper portion of stop member 10 extending from the upper end thereof to the tip of the claw 10' has an arcuate front surface substantially coinciding with a part of the periphery of the ratchet wheel 9 in the stop member retracted position. Specifically, when the claw 10' is in its lowermost position as shown in FIG. 3, the upper portion of the stop member 10 forms a part of the circumference of the hole 8b in the auxiliary member 8.

There is provided displacement member or pendulum 12, such as a swingably suspended or movable weight or the like, which is displaced by positive or negative acceleration or variation in speed experienced by the vehicle in an emergency or when the vehicle collides with something. The displacement member 12 includes a weight portion 12a and an arm portion 12b and is suspended from the upper wall of a housing or receiver 13 therefor. The displacement member 12, which constitutes an acceleration or displacement sensing means, serves to transmit the movement or displacement thereof to the lever 11 supported with the middle portion thereof in axial alignment with a recess provided in the central portion of the upper surface of the receiver 13. The displacement member 12 thus controls the vertical movements of the stop member 10.

A cover member 14 overlies auxiliary member 8 and housing 13 and is secured to member 8 and side plate 1b by rivets 15 and a rivet 17 pivotly secures lever 11 to receiver 13, which rivet 17 engages a hole 18 in a projection or post on the upper surface of the receiver 13 and a hole in one end portion of the lever 11. Screws 19 secure the receiver 13 to the side member 1a, which screws engage holes 20 in flanges along the rear edges of the receiver 13 and holes in the side member 1a. A reinforcing connector or cross bar 7 is disposed between and joined to the upper parts of the side members 1a, 1b.

Considering now the operation of the above-described retractor, FIG. 3 shows the retractor in the case where the vehicle is stationary or running at a constant speed or in a normal condition. In this condition, the displacement member 12 is stationary or almost stationary and in a position normal to the vehicle and the lever 11 provided above the upper surface of the receiver 13 and the stop member 10 is provided on the side member 1a are maintained in their lowermost positions by their own weights or by means of light springs (not shown). At this time, the claw 10' of the stop member 10 is disengaged from the ratchet wheel 9. In this condition the ratchet wheel 9, shaft 3 and reel 4 can be freely rotated to allow the vehicle safety belt A to be freely retracted and withdrawn or extracted in accordance with the movement of the belt retained vehicle occupant.

When the retractor carrying vehicle collides with an object so that a negative acceleration or speed variation occurs, the upper end portion of the displacement member 12 is displaced in the upward direction to raise the outer end portion of the lever 11, as shown in FIG. 4. At this time, the stop member 10 is longitudinally moved in the tangential direction with respect to the periphery of the ratchet wheel 9, and the claw 10' of the stop member 10 slightly engages the teeth of the ratchet wheel 9. In this case, the belt A is strongly pulled in the extraction direction by the momentum of the belt retained vehicle occupant and the ratchet wheel 9 is urged to rotate in a counter-clockwise direction as viewed in FIG. 4. Moreover, even when the displacement member 12 returns to its original position with the raised end portion of the lever 11 lowered, the stop member 10 is further longitudinally advanced in the tangential direction relative to the periphery of the ratchet wheel 9. Consequently, the claw 10' of the stop member 10 gradually or progressively deeply engages the teeth of the ratchet wheel 9 as shown in FIG. 5. The stop member 10 is thus raised by the ratchet wheel 9 until the sliding movement or advance thereof has been stopped by the upper receiving surface or stop shoulder of the recess 8a in the auxiliary member 8 as shown in FIG. 5. While the stop member 10 is slidingly advanced as explained above, the claw 10' is never kicked off or rebound from the tips of the teeth of the ratchet wheel 9. When the sliding movement of the stop member 10 is stopped, the rotation of the shaft 3 and withdrawal of the belt A are simultaneously fully braked and stopped.

When the belt A is then slacked or relieved and retracted by the retraction spring, the ratchet wheel 9 rotates clockwise as viewed in FIG. 4 and the stop member 10 is returned to its original position as shown in FIG. 3.

FIG. 6 shows another embodiment of the retractor of the present invention. The construction of this embodiment is similar to that of the embodiment described above. In this embodiment, however, a pair of stop members 10a and 10b are provided in recesses 8a formed in portions of an auxiliary member 8 which are at the opposite sides of the ratchet wheel 9, and these stop members 10a and 10b are interconnected by a connector member 21 which is centrally pivotally supported on the ratchet wheel 9 at the axis of the ratchet wheel and which are connected at both ends thereof to a respective end of each of the stop members 10a and 10b by pins 23 engaging longitudinal slots 22 provided in the end portions of the connector member 21, the pins 23 projecting from stop members 10a and 10b. The stop members 10a and 10b slidingly move in opposite directions. When the displacement member 12 swings upwardly, the outer end of lever 11 is thereby raised to longitudinally advance the stop member 10a in the upper direction. Simultaneously, the other stop member 10b is moved by the connector member 21 in the downward direction. When the stop member 10a thus engages the teeth of the ratchet wheel 9, the stop member 10b simultaneously engages therewith at the opposite side thereof.

When two stop members are employed which are provided at the opposite sides of ratchet wheel, the force exerted on the teeth of ratchet wheel and on the claws of stop members, which are repeatedly actuated and subjected to wear, can be damaged, but in a retractor employing two stop member, the likelihood of damage is greatly reduced.

In the retractor of the present invention, a single stop member slidingly movable in the downward direction like the stop member 10b used in the last described embodiment can be employed to which the displacement of lever 11 is transmitted by a suitable means. The construction of the various parts of the present invention is not limited to that of those as described above, it can, of course, be modified within the scope of the present invention.

With the retractor of the present invention having the above-described construction, it is unnecessary to use pawls as are provided in conventional retractors, which are disposed between the side members of the mounting frame and swung to be engaged with the teeth of the ratchet wheel. The retractor of the present invention is provided with a stop member which is slidable in a direction tangential to the periphery of the ratchet wheel. This serves to greatly simplify the construction of the retractor to prevent any kicking movement of or rebound from the teeth of the ratchet wheel, and increase the reliability of the device. In addition, the stop member receiving surface being of great width and being provided in the auxiliary member of the mounting frame serves to absorb the unnecessary forces produced by the stop member being vertically slidably moved so as to produce a reliable effective engagement between the claw thereof and the teeth of the ratchet wheel. Thus, the operation of the stop member is always normal and the retractor operates reliably and smoothly.

While there have been described and illustrated preferred embodiments of the present invention, it is apparent that numerous alterations, omissions and additions may be made without departing from the spirit thereof.

I claim:

1. A vehicle acceleration responsive automatic braking retractor comprising a belt retracting rotatable reel (2), a ratchet wheel (9) rotatable with said reel (2), a stop member (10) having a claw (10') engageable with and disengageable from said ratchet wheel (9) and being longitudinally slidable in a tangential direction substantially parallel to a tangent to said ratchet wheel (9), a displacement member movable according to the degree of acceleration of the vehicle, means responsive to a predetermined movement of said displacement member to advance said stop member (10) so as to transfer said claw (10') to a position engaging said ratchet wheel (9), a frame (1) supporting said reel and including a side member (1a), an auxiliary member (8) secured to said side member and having a recess (8a) slidably engaged by said stop member, a portion of said auxiliary member (8) bordering said recess 8a having a first stop shoulder restricting the upper limit of the vertical movement of said stop member (10) and an inclined claw-receiving inner surface positioned to restrict the lower limit of the vertical movement of said stop member (10).

2. An acceleration responsive retractor according to claim 1, comprising a pair of said stop members (10a, 10b) disposed at opposite sides of said ratchet wheel (9) and a connector member (21) pivotally supported on the center point of said ratchet wheel (9) and intercoupling said stop members (10a, 10b) so that when one stop member (10a) is slidingly moved in an upward direction, the other stop member (10) is slidingly moved in the downward direction.

3. An acceleration responsive retractor according to claim 2, wherein said connector member (21) has at both end portions thereof elongated slots (22) and comprising pins (23) located on said stop members (10a, 10b) and engaging said slots (22) so as to pivotally connect said stop member (10a, 10b) to said connector member (21).

4. An acceleration retractor according to claim 3 wherein said stop member (10) has a curved inner surface at the upper portion thereof extending from the upper end of said stop member to the tip of said claw (10'), the radious of said curved inner surface being equal to that of the outer periphery of said ratchet wheel (9).

5. An automatic braking safety belt retractor comprising a reel rotatable in opposite belt extraction and retraction directions, a peripherally toothed wheel coupled to and rotatable with said reel, guide means defining a linear guide groove extending along a direction parallel to a tangent to the periphery of said wheel and a pair of first and second stop faces, a stop member slidably engaging said guide groove and longitudinally movable between a retracted position engaging and restricted by said first stop face against further retraction and an advanced position engaging and restricted against further advance by said second stop face and including a transverse projection movable with said stop member alternatively to a wheel disengaged position with said stop member in its retracted position and to a wheel engaging position with said stop member in advance of its retracted position, and condition responsive means for advancing said stop member to a projection wheel engaging position.

6. The retractor of claim 5 wherein said retractor is mounted in a vehicle and is responsive to a predetermined acceleration of said vehicle to advance said stop member to a projection wheel engaging position.

7. The retractor of claim 6 comprising a mounting plate rotatably supporting said reel and including a side plate, said toothed wheel being disposed along the outside face of said side plate and said guide means comprises an auxiliary plate secured to said side plate outside face and having a circular opening coaxially engaging said toothed wheel and a slot defining said guide groove and extending tangentially to and communicating at an elongated side opening thereof with said circular opening, said stop member slidably engaging said slot.

8. The retractor of claim 7 wherein said elongated side opening has an upwardly facing end shoulder defining said first stop face and said slot has a downwardly facing end shoulder defining said second stop face.

9. The retractor of claim 8 wherein said transverse projection has outwardly converging top and bottom edges, said top edge being arcuate and substantially coinciding with the periphery of said toothed wheel when said stop member is in its fully retracted position in which position said bottom edge engages said upwardly facing end shoulder.

10. The retractor of claim 5 comprising a pair of said guide grooves disposed on opposite sides of said toothed wheen and a respective stop member slidably engaging each of said guide grooves, and means intercoupling said stop member for simultaneously advancing and simultaneously retracting said stop members.

* * * * *